United States Patent [19]
Nansel

[11] 3,743,241
[45] July 3, 1973

[54] SOLENOID CONTROLLED VALVE SYSTEM
[75] Inventor: Harold K. Nansel, Waverly, Nebr.
[73] Assignee: National Crane Corporation, Lancaster County, Nebr.
[22] Filed: Apr. 26, 1971
[21] Appl. No.: 137,263

[52] U.S. Cl. ................................... 251/138, 200/5
[51] Int. Cl. ........................................ F16k 31/10
[58] Field of Search .................................... 251/138

[56] References Cited
UNITED STATES PATENTS
1,284,197  11/1918  Larner et al. .................. 251/138 X
2,827,259  3/1958   Kindt ............................. 251/138 X
2,259,973  10/1941  Firehammer .................... 251/138 X FOREIGN PATENTS OR APPLICATIONS
1,215,122  12/1970  Great Britain ..................... 251/138

Primary Examiner—Arnold Rosenthal
Attorney—Zarley, McKee & Thomte

[57] ABSTRACT

The valve element of a valve is connected to a rotatable drum for incrementally rotating the valve element between open and closed positions. An advance solenoid is connected to a band which embraces the drum such that each time the solenoid is actuated the drum is turned slightly. A second solenoid includes a band extending around the drum such that upon the solenoid being actuated, the drum is locked against return rotation. A return spring engages the drum and a return retard dash pot opposes the return spring. The speed of a power source operating the pump connected to the valve is varied by the drum actuating a speed control switch which increases the speed of the power means. The switches for operating the solenoids are embodied in a pivotal lever by two double throw switches engaging a cross arm on the lower end of the lever and a third switch being in the exposed free end of the lever. The cross arm has oppositely extending portions of different lengths such that when the lever is pivoted the switches will be actuated sequentially.

5 Claims, 10 Drawing Figures

INVENTOR
HAROLD K. NANSEL
BY
Zarley, McKee & Thomte
ATTORNEYS

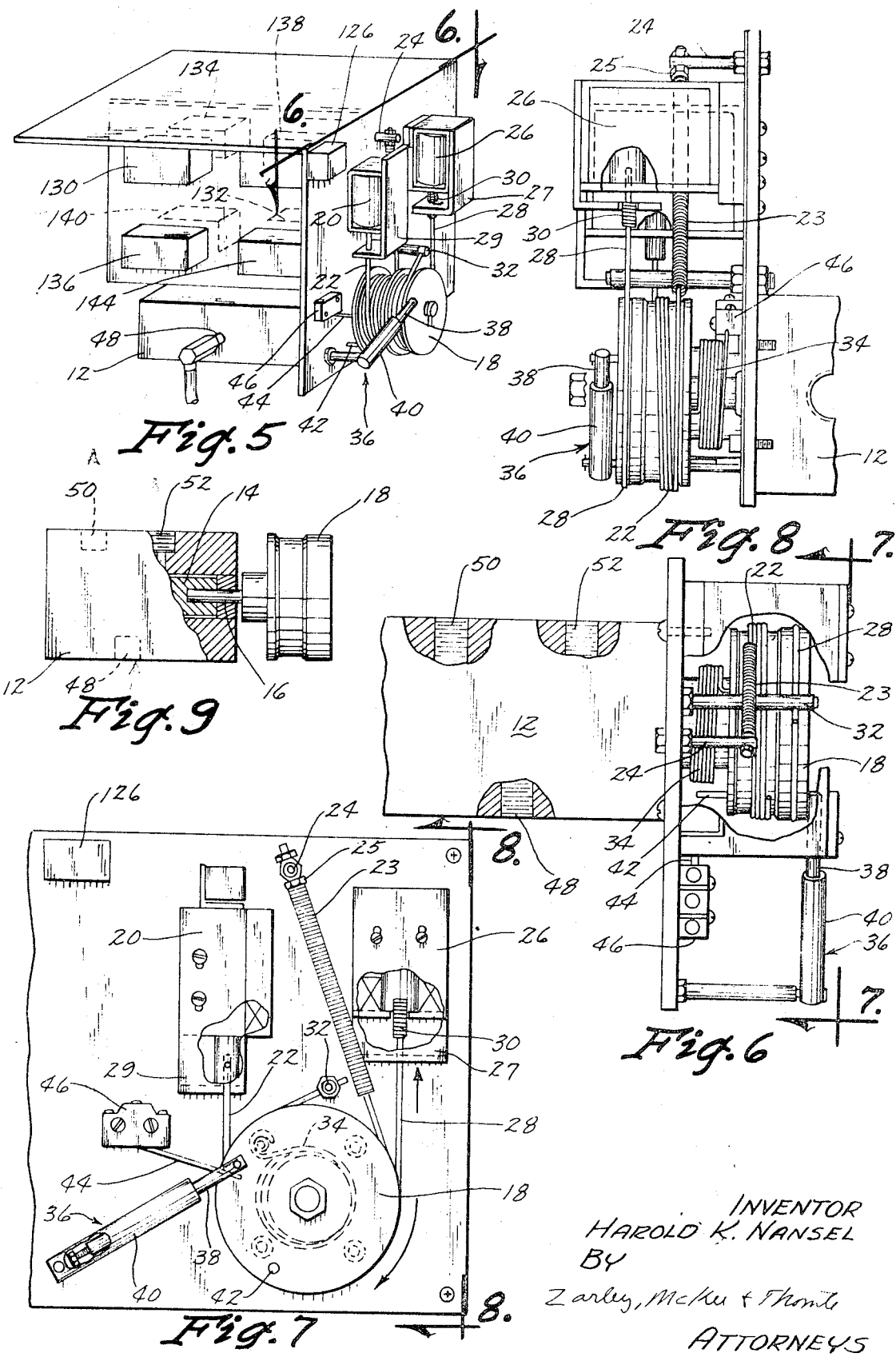

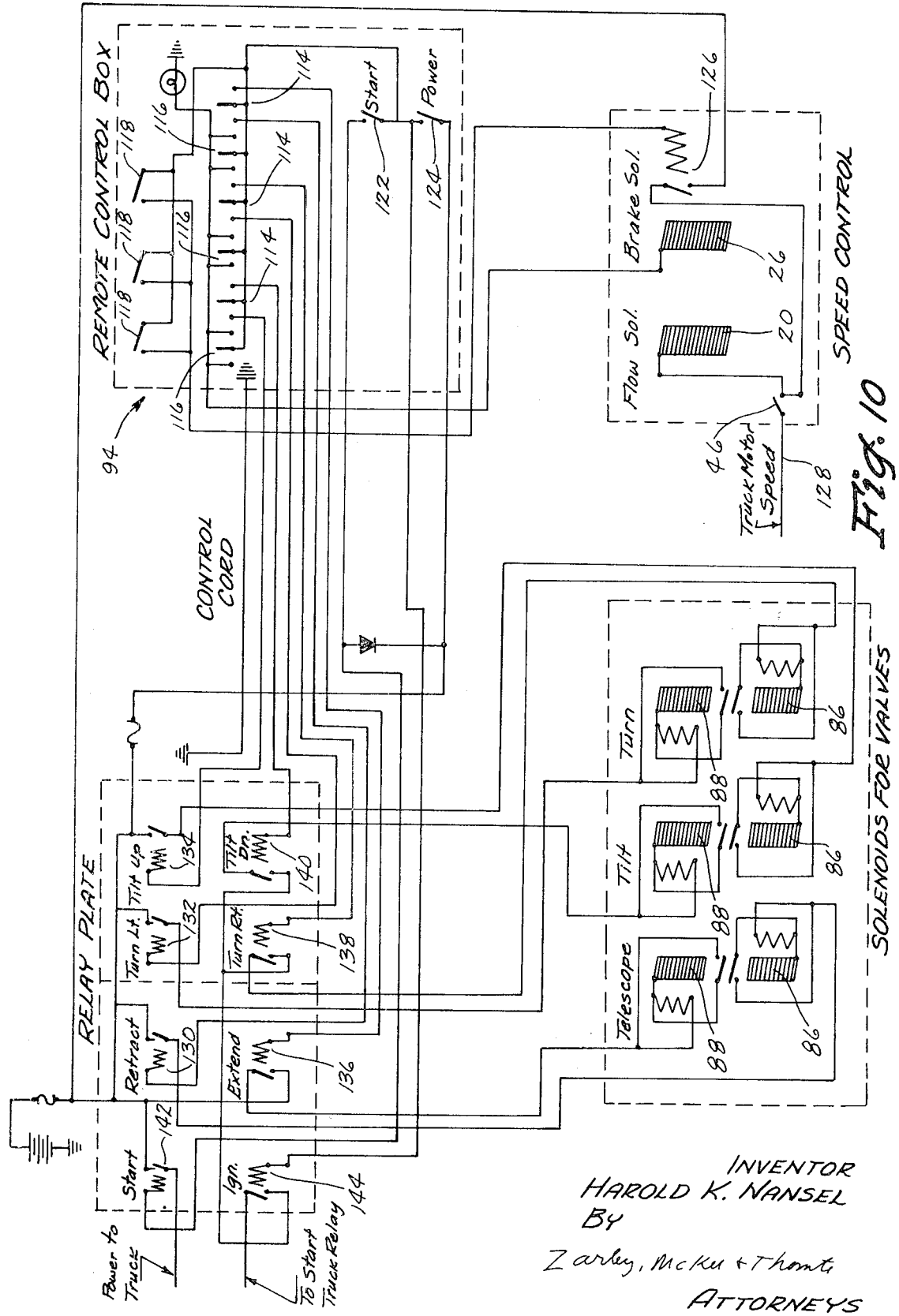

SOLENOID CONTROLLED VALVE SYSTEM

A hydraulic valve operated by conventional solenoid controls involves by nature extreme movements of the valve element since the solenoid upon being activated moves from one position to its other extreme position. There are no inbetween positions of operation for conventional solenoids. Thus, hydraulic power cylinders or the like connected to solenoid operated valves suffer from rough and jerky operation. This is particularly undesirable on cranes having several power cylinders. A crane may have an extension cylinder, a right-left cylinder, and an up-down cylinder. A flow divider valve which opens fully or closes fully causing whatever oil is flowing through the valve to immediately pulse into the actuating cylinder or motor creating a jerky condition is undesirable for crane operational purposes.

In the unit of this invention the oil input is controlled through an electrically controlled variable flow control or flow divider allowing a minimum amount of oil to flow through the valve continuously so that when the valve is opened the resulting oil flow is sufficiently low in volume to cushion the starting pulse and then the cushion flow is increased electrically as increased speed is desired. An overriding switch system is brought into play such that when the flow control or flow divider has been opened to the full extent of its capability the engine is speeded up to provide further increase in actuation speed. A reverse operation then causes a slowing down of the operation until a soft "stop point" has been achieved. This assembly with the controller, speed control, and a solenoid attachment can be applied to existing manual control hydraulic valves or the controller and speed control assembly only may be used with solenoid valves existing on a machine.

A remote control switch actuating lever is provided for operation of each of the power cylinders and involves the lever being pivoted to a base support with a cross arm pivotally connected to one end of the lever. The oppositely extending portions of the cross arm differ in length and are connected to double throw switches such that when the lever is pivoted in either direction one switch is actuated first followed by the second switch. A third switch is provided in the opposite end of the lever to be actuated by a person's hand.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 5 is a perspective view of the solenoid controlled flow divider valve.

FIG. 6 is a cross sectional view taken along line 6 — 6 in FIG. 5.

FIG. 7 is a elevational view taken along line 7 — 7 in FIG. 6.

FIG. 8 is a cross sectional view taken along line 8 — 8 in FIG. 7.

FIG. 9 is a reduced in scale fragmentary view of the flow divider valve and its connection to the rotatable drum.

FIG. 10 is an electrical schematic drawing for the solenoid controlled valve system.

Figure 1:
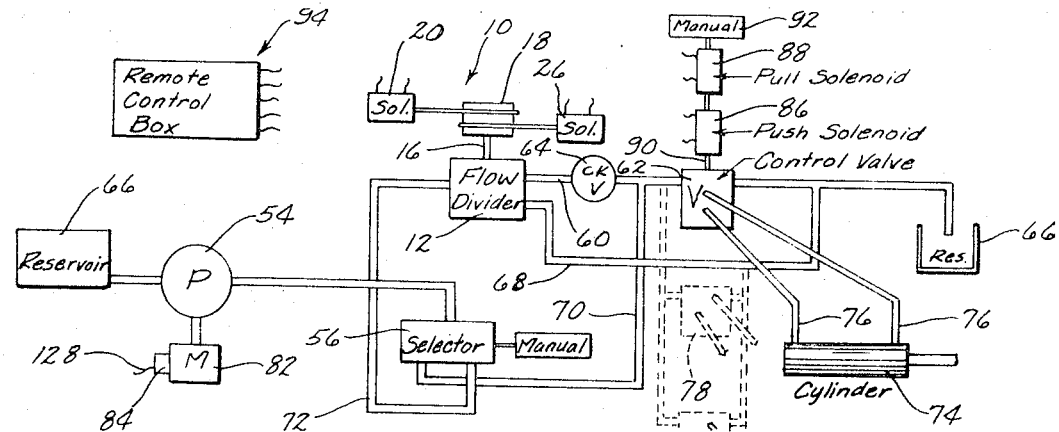
FIG. 1 is a hydraulic schematic of the remote control system with selector valve.
Figure 2:
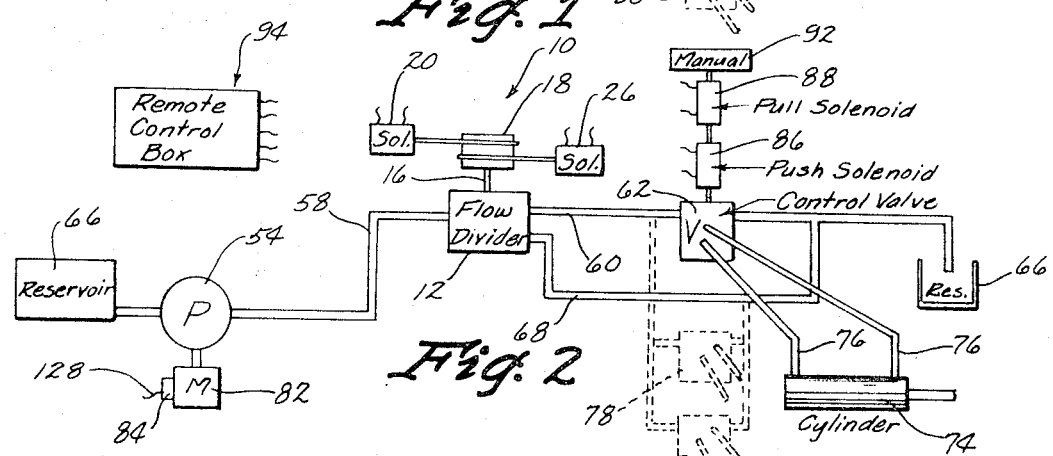
FIG. 2 is a hydraulic schematic of the remote control system less a selector valve.

The solenoid control group of this invention is referred to generally in FIGS. 1 and 2 by the reference numeral 10 and includes the flow divider valve 12 having a valve element 14 (FIG. 9) operated by a valve stem 16 coupled to a rotatable drum 18. The drum 18 is rotated by an advance pulse solenoid 20 (FIG. 5).

Referring to FIGS. 5 – 8, it is seen that the advance pulse solenoid 20 is connected to a band 22 which extends three times around the drum 18 with its opposite end connected to an extension spring 23 anchored on a pin 24. An adjustment nut 25 is provided for placing the band 22 under the desired tension around the drum 18.

A brake and advance clutch actuation solenoid 26 is provided on the opposite side of the drum 18 and includes a band 28 connected to a spring 30 on the solenoid and then around the drum 18 to a rigid anchor pin 32. A return spring 34 embraces the inner end of the drum 18 to rotate the drum in a counterclockwise direction against the action of the advance pulse solenoid 20. The return spring is dampened and opposed by a return retard dash pot 36 including a piston 38 and cylinder 40. A pin 42 is carried on the inner end of the drum 18 for engagement with the actuation element 44 of a engine speed control switch 46 in the path of rotation of the pin 42 as seen in FIG. 6.

Referring now to FIGS. 1, 2, 6 and 9, it is seen that the flow divider valve 12 includes an inlet opening 48 and two outlet openings 50 and 52. In FIG. 1 a pump 54 is in communication with the inlet opening 48 through a selector valve 56 and in FIG. 2 the pump 54 is connected directly to the inlet opening 48 by a conduit 58. In FIG. 1, showing a remote control system with selector, a conduit 60 communicates with a control valve 62 through a check valve 64 while the outlet opening 52 is in communication with a reservoir 66 through a conduit 68. A line 70, between the check valve 64 and the control valve 62, returns to the selector 56 which in turn is in communication with the flow divider through a line 72. One of three power cylinders 74 is shown in FIG. 1 connected by conduits 76 to the control valve 62. The control valves 78 and 80 are shown for the other two cylinders not shown.

In FIG. 2, showing the remote control system less the selector, the conduit 68 extends from the flow divider outlet 52 to the reservoir in the same fashion as seen in FIG. 1. In each of FIGS. 1 and 2 a power means such as the truck engine or the like 82 drives the pump 54 and its speed is controlled by a control box 84.

It has been found that the flow divider valve in its internal construction may be of a design provided in a Waterman series 1407 Flow Regulators. The selector valve 56 is adapted to alternately place the outlet conduits in communication with the inlet conduit in the control valve 62.

The control valve 62 is designed to close off flow to the power cylinder 74 or selectively direct it to either end thereof through the conduits 76. Thus the push solenoid 86 and the pull solenoid 88 when actuated will operate the valve stem 90 to direct fluid to the opposite ends of the cylinder 74 and when in a neutral position will close off flow of fluid to cylinder 74 completely.

Manual controls 92 are shown connected outwardly of the solenoids 86 and 88 and are operated by these solenoids.

Figure 3:
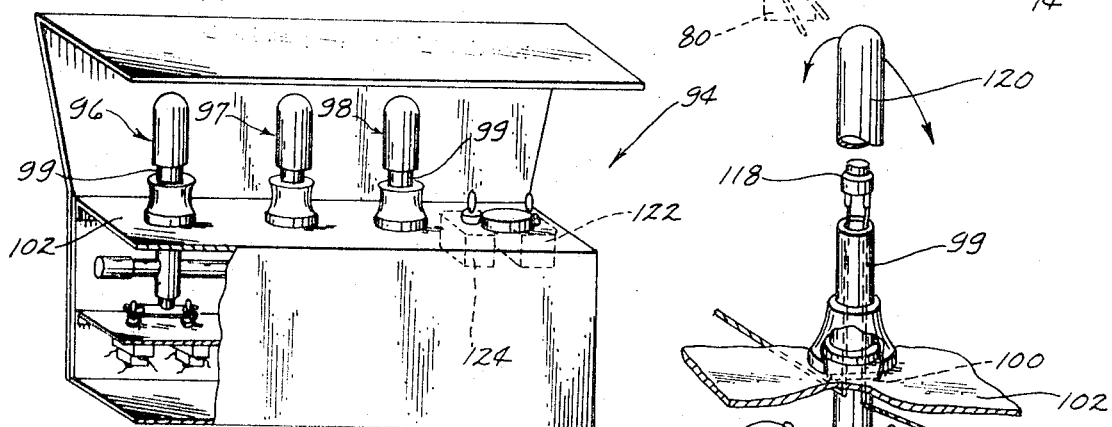
FIG. 3 is a fragmentary side elevational view of the remote control switches.
Figure 4:
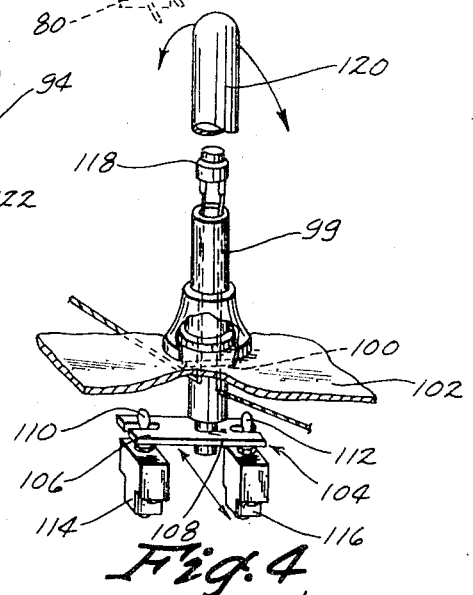
FIG. 4 is an enlarged fragmentary view of one of the switch levers of FIG. 3.

The controller assembly 94 is seen in FIGS. 3 and 4 and includes three lever assemblies 96, 97 and 98 for each of the three power cylinders or hydraulic motors, cylinder 74 only being shown in FIGS. 1 and 2. A lever 99 is pivoted about a pin 100 secured to the base plate 102 for moving back and forth a cross arm 104 pivotally mounted on the lower end of the lever 99. The cross arm 104 includes a first arm 106 which is longer than the oppositely extending arm 108 such that the toggles 110 and 112 of the switches 114 and 116, respectively, will be actuated sequentially rather than simultaneously. The shorter arm 108 will actuate the associated toggle 112 before the longer arm 106 actuates the associated toggle 110. A third switch 118 is of the push-button type and is located in the upper end of the lever 99 enclosed by a cover 120. These switches are shown in more detail in the electrical schematic of FIG. 10 which also includes the start and power switches 122 and 124, respectively. An advance pulse solenoid relay 26 is provided in series with the switches 118 and is closed each time the switches 118 are activated to advance incrementally the rotation of the drum 18. A speed control switch 46 is normally open as seen in FIG. 10 and will be closed upon the drum rotating sufficiently for the pin 42 to engage the lead 44, thus making a circuit 128 from the switch 46 to the engine speed control box 84, as seen in FIGS. 1 and 2.

As seen in FIGS. 1 and 2, two push and pull solenoids 86 and 88 are provided for each control valve for each mode of movement and these solenoids are included in the electrical schematic of FIG. 10 designated as telescope, tilt and turn. Associated relays 130, 132, and 134 are connected to the solenoids 86 while relays 136, 138 and 140 are associated with the solenoids 88. Start and ignition relays 142 and 144 are connected to the start and power switches 122, 124, respectively.

In operation it is seen that similar structure and circuitry are employed for each of the three modes of operation for the three power cylinders. The control assembly operation involves the lever 99 being pivoted such that the short arm 108 will cause the nearest switch 116 to actuate which in turn actuates the solenoid control valve 62 allowing a minute amount of hydraulic fluid to flow to the hydraulic cylinder 74 controlled by the control lever 99. Further movement of the lever 99 will cause the actuated switch 116 to act as a pivot for the switch 114 which will send a pulse of current to the brake solenoid 26 thereby locking the advance clutch drum 18.

The depression of the switch 18 will advance the pulling band 22 causing the drum 18 to rotate thus allowing more fluid from the hydraulic system to the solenoid actuated control valve 62 through the flow divider valve 12. Continuing pulses on the handle switch 99 advances the flow until the flow divider 12 is fully opened. At this point, the pin 42 on the drum 18 actuates switch 46 allowing current from switch 46 on the lever to flow to the throttle advance 84 on the engine 82, thus, speeding the hydraulic pump from an idle to a higher speed, consequently, delivering more oil to the power cylinder 74. As long as the switch 118 is depressed, the hydraulic fluid will flow at a higher preset volume, consequently, a greater operational speed results. Release of the switch 118 slows the pump decreasing the operational speed since the engine 82 will be slowed as the circuit through the switch 46 will be opened by the relay 126 being deactivated. Further operational speed slowing is accomplished by release of handle 99 until switch 114 connected to the longer arm 106 opens allowing the brake solenoid 26 to release its band 28 around drum 18 whereby return spring 34 will return drum 18 to its normal position against the action of the return retard dash pot 36 thus causing fluid to return to a minimum through the flow divider 12, at a smooth decelerating rate.

Further release of the lever 99 to a neutral position opens switch 116 on the shorter arm 108 breaking the electrical field in the valve solenoids 86 and 88 thus stopping flow to the power cylinder 74 as the control valve 62 returns to an off position without an abrupt stop due to minute flow of fluid through valve 62.

It is thus seen that the pulse or advance band 22 has a spring 23 that is adjustable to allow for the number of steps required to advance the valve element 14 in the flow divider 12 to a fully opened position and also to cause a pretension on this band so it grips when pulled as it is wrapped around the drum 18 three times, When the solenoid 20 is energized. The brake solenoid 26, on the other hand, is anchored solid to the mounting plate and has a spring 30 between the band and the solenoid plunger so that as the drum rotates in a clockwise direction the band pulls on the spring thus releasing the braking effect allowing advance of the flow control or flow divider 12 and then restores itself to a grip or holding position. This band is then released when it is desired to return to a slow speed after having advanced the flow control divider 12. Adjustable plunger stops 27 and 29 provide for a proper amount of slack of bands 22 and 28 so drum is free to rotate when solenoids 20 and 26 are de-energized.

The selector valve 56 in FIG. 1 is provided to allow use of a standard crane with a given amount of oil flowing into it as a standard unit to be shifted to a position where oil is run through the oil divider and into the control valve through a check valve or alternatively oil may flow directly from the pump through the selector to the oil line to the control valve using the check valve as a block against oil flowing back through the flow divider. The system of FIG. 2 is the same except that there is no selector valve and is used only as a remote control unit. The only reason for a selector valve on a standard unit is to allow for manual operation of controls at a higher speed than would be possible if the oil were flowing continuously through the solenoid controlled flow divider.

I claim:

1. A solenoid controlled valve, said valve including a valve body having inlet and outlet openings and a valve element in said valve body for opening and closing said openings, said valve element having a stem extending from said valve body, wherein the improvement comprises, a rotatable drum connected to said stem for rotating said valve element between open and closed positions, a solenoid operatively connected to said drum for incrementally rotating said drum upon said solenoid being electrically activated, said drum includes a band extending therearound, one end of said band being connected to said solenoid, the opposite end of said band is yieldably anchored by a spring to maintain said band in engagement with said drum, such that upon said solenoid being deactivated said spring will retract said band relative to said drum for additional incremental rotation to be imparted to said drum upon said solenoid being again activated, a second solenoid is connected to one end of a second band extending around said drum, and the other end of said second band being anchored such that upon said second solenoid being activated said drum will be limited against rotation when said first band is being retracted relative to said drum.

2. The structure of claim 1 wherein said first and second bands extend around said drum in opposite directions.

3. The structure of claim 1 wherein said second band includes a spring for allowing it to extend when said second solenoid is activated and said first solenoid is being activated to incrementally advance said drum.

4. The structure of claim 3 wherein a return spring engages said drum for returning said drum to its starting position upon said first and second solenoids being deactivated.

5. The structure of claim 4 wherein a return retarded dash pot is connected to said drum in opposition to said return spring.

* * * * *